United States Patent Office.

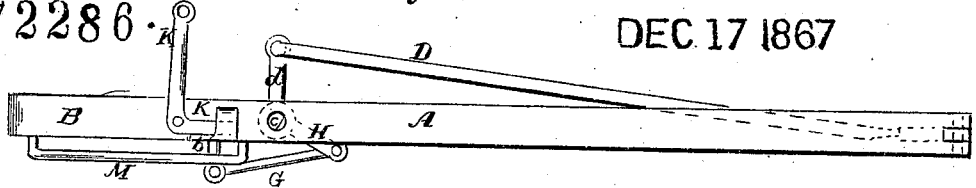
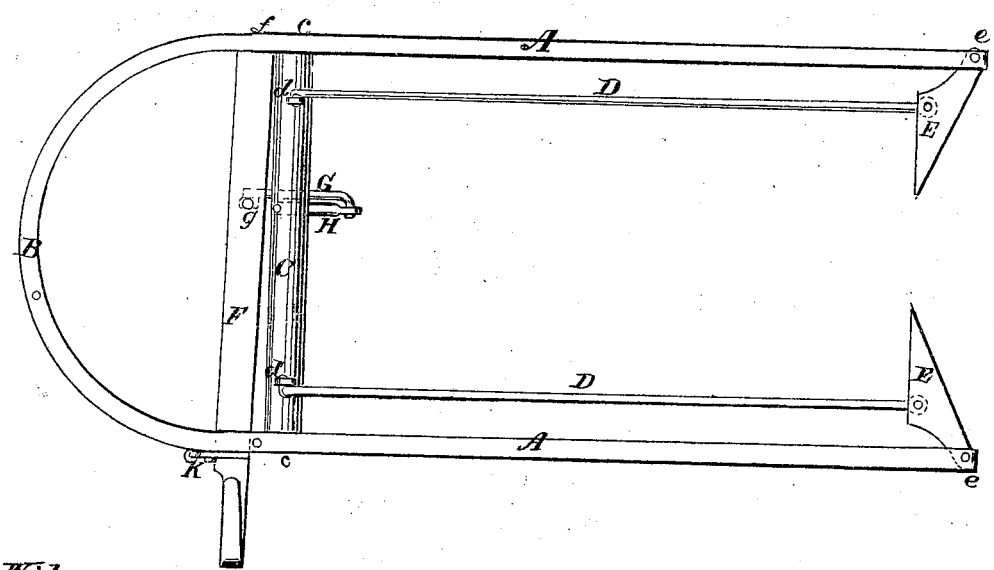

JOSEPH S. GOCHNAUER, OF YORK, PENNSYLVANIA.

Letters Patent No. 72,286, dated December 17, 1867.

IMPROVEMENT IN HORSE HAY-FORKS.

*The Schedule referred to in these Letters Patent and making part of the same.*

TO ALL WHOM IT MAY CONCERN:

Be it known that I, J. S. GOCHNAUER, of York, in the county of York, and State of Pennsylvania, have invented a new and useful Improvement in Hay-Forks; and I do hereby declare that the following is a full, clear, and exact description thereof, which will enable others skilled in the art to make and use the same, reference being had to the accompanying drawings, forming part of this specification.

This invention relates to an improvement in hay-forks, in which two tines are made in one piece, two lifting-toes being employed, which are simultaneously operated by means of an oscillating bracing-roller and a spring-lever, substantially as hereinafter described. In the accompanying drawings—

Figure 1 is a side, and

Figure 2 a front view of my improved hay-fork.

Similar letters of reference indicate corresponding parts.

A A are the tines, made in one piece, with a bow, B, whereby great strength is obtained. C is an oscillating roller, journalled in the tines A, at $c$ $c$, a little below the spring of the bow B, in such a manner that while the roller serves to operate the points of the tines, it also serves to brace and strengthen the tines A. Projecting arms, $d$ $d$, are set upon the roller C, at the ends thereof, which arms connect with the rods D D, having their other extremities pivoted to the metallic lifting-toes E E, which are pivoted to the tines at $e$ $e$. A lever of the second order, F, having its fulcrum on one of the tines at $f$, has an arm, $g$, connected by the rod G with the arm H, which is set upon the roller C. When the lever F is moved, the roller C is oscillated, and the toes E are also operated through the rods D, which connect with the roller, as before described.

To use the fork, the lever F is raised, drawing up the arm H, rotating the roller C, throwing down the arms $d$ $d$, and thereby throwing the toes E into vertical line with the tines A A. In this position the fork is inserted into the hay, straw, or other material to be lifted, and locked by allowing it to spring into the locking-recess $b$, in the tine, as shown. The act of depressing the lever F reverses the oscillation of the roller G, thereby drawing up the arms $d$ $d$, throwing the toes E into position horizontal to the tines, and holding the hay or other material above and between the tines, in which condition the fork and its load may be raised, the lifting-rope being applied at $x$, as shown in red. The hay or other material, after being lifted into the desired place, is readily discharged by the operator, who pulls a cord attached to the trip-lever K, when the small arm thereof forces the lever F out of the locking-recess, and the weight of the load causes the toes to open and discharge the load. A curved guide, M, set into the side of the bow B, for about one-third its circumference, retains the lever F in proper position.

Having thus described my invention, what I claim as new, and desire to secure by Letters Patent, is—

1. Operating the movable toes by means of an oscillating roller, C, substantially as herein shown and described.

2. Strengthening and bracing the tines by means of the roller which operates the toes, in the manner substantially as herein shown and described.

3. The combination of the spring-lever F with the oscillating roller C and the tines A, substantially as herein shown and described.

4. The locking-recess $b$, when used in combination with the spring-lever F, substantially as herein shown and described.

5. The discharge-lever K, arranged and operating in combination with the said locking-recess and the spring-lever, as set forth.

JOSEPH S. GOCHNAUER.

Witnesses:
 D. G. S. GOCHNAUER,
 JOSEPH R. REESER,
 GEORGE M. SHETTER.